United States Patent Office 3,823,111
Patented July 9, 1974

---

3,823,111
POLYURETHANES
Frederic Christian Loew, Ridgewood, and Edward Stone, Morris Plains, N.J., assignors to Inmont Corporation, New York, N.Y.
Continuation of abandoned application Ser. No. 819,337, Apr. 25, 1969. This application Jan. 13, 1972, Ser. No. 217,671
The portion of the term of the patent subsequent to Jan. 9, 1990, has been disclaimed
Int. Cl. C08g 22/06, 51/44
U.S. Cl. 260—32.6 NR                8 Claims

ABSTRACT OF THE DISCLOSURE

Microporous leather substitutes are made from high molecular weight linear thermoplastic elastomeric polyurethanes of I.V. 0.9–1.4 which have been prepared by reaction in solution in dimethylformamide ("DMF") solvent which contains substantially no free tertiary amine. A monofunctional strong mineral acid is added to neutralize free tertiary amine groups. A hydroxy-terminated prepolymer and a diol chain extender are reacted with a small excess of diisocyanate, until the —NCO content becomes constant, then a diol chain extender in amount equivalent to the remaining —NCO and reaction is continued, and then terminated with methanol after the high I.V. is attained. The reactants may include very small amounts of trimethylolpropane and methanol (in equimolar proportions) to give controlled chain branching.

---

This is a continuation of application Ser. No. 819,337, filed Apr. 25, 1969, now abandoned.

This invention relates to the production of microporous materials.

In accordance with one aspect of this invention a microporous material is prepared by a process in which a hydroxyl-terminated prepolymer dissolved in dimethylformamide ("DMF") is reacted with a diisocyanate and a diol to form a dissolved thermoplastic elastomeric polyurethane of intrinsic viscosity in the range of 0.9 to 1.4, the resulting solution is mixed with a microparticulate pore forming material and the mixture is formed into a thick layer and coagulated by incorporating water into the solution.

It has previously been proposed to react the hydroxyl-terminated prepolymer with diisocyanate and diol in molten condition and then dissolve the resulting product in the DMF, whereupon a further prepolymerization reaction takes place. By carrying out substantially the entire reaction in DMF, rather than merely the last stages, it has been found possible to obtain a highly soluble, high molecular weight product, with better control of the polymerization reaction (including control of such factors as reaction rate, viscosity, molecular weight, linearity of the polymer, solubility, and solids content), better reproducibility of the results (including the properties of the final microporous product) and improved quality control.

A preferred embodiment of the invention employs a novel multistage reaction method in which the proportions of the reactants supplied to the earlier stage, i.e. to the reaction of the hydroxyl-terminated linear prepolymer, diisocyanate and diol chain extender, are such that there is a small stoichiometric excess of isocyanate groups (an excess of less than 20 mol percent, e.g. 5 to 15 mol percent) and the reaction is continued, in the solvent, until the isocyanate content reaches a constant level, as shown by analysis of a sample of the reaction mixture (for instance by titration with a 0.01 N solution of ni-dibutyl-amine in dry tetrahydrofuran). At this time there are substantially no unreacted hydroxyl groups in the reaction mixture. Then, in the later stage, an amount of diol chain extender sufficient to provide one alcoholic hydroxyl group for each unreacted isocyanate group, as determined by that analysis, is added; the ensuing reaction of the isocyanate and hydroxyl groups is continued at controlled temperature and the viscosity of the mixture is measured during this reaction until a viscosity corresponding to an intrinsic viscosity in the range of about 0.9 or 0.95 to 1.4 is reached. At this time an end-capping reagent, such as an alcohol (e.g. methanol or butane-diol) or other chain-terminating reactant is added to stop the reaction. This procedure provides a highly controllable way of producing a novel product of controlled, stable, very high molecular weight which is not further reactive with water or other isocyanate-reactive compounds under normal conditions and which does not gel on storage (e.g. storage of the solution at room temperature for many months).

The amount of diol chain extender supplied to the later stage is below 20 mol percent (e.g. in the range of about 5 to 15 mol percent) of the amount of chain extender present in the earlier stage.

A preferred embodiment of the invention provides for regulation of the linearity of the polymer. The prior art, such as Japanese Patent 43–1880 published Jan. 23, 1968, points out that temperatures of below 40° C. and preferably below 30° C. should be used when an organic diisocyanate is reacted in DMF. According to that patent the diisocyanate dimerizes or trimerizes at higher temperatures and it is therefore absolutely essential that the operation should be carried out within the above-mentioned temperature range. British Pat. 1,104,174 published Feb. 21, 1968, teaches that diisocyanates polymerize in DMF stating that: "Exact investigations lead to the conclusion that during polymerization a trimerization primarily takes place with formation of isocyanuric acid rings. During further molecular growth, a system cross-linked in all directions and consisting of isocyanuric acid units linked together is formed which the dialkyl formamide enters into a solution or a molecular bond." We have discovered that this reaction of the diisocyanate with, or in the presence of, the DMF is due to the fact that the DMF commonly contains minute amounts of tertiary amines, e.g. 1, 5, 10, 15 or 20 p.p.m. of trimethylamine and bisdimethylaminomethane. We have also discovered that the dimerization and trimerization reactions may be suppressed even at temperatures above 40° C. (e.g. 50° C.) by using DMF which contains substantially no free tertiary amine. We have found that the effect of the tertiary amine can be overcome by carrying out the reaction in the presence of a monosulfonic acid in an amount of at least about one sulfonic acid group per tertiary amino nitrogen. The action of the monosulfonic acid may be to form a salt with the tertiary amine so that substantially no free tertiary amine is present. It is also within the broader scope of the invention to use a DMF whose tertiary amine content has been reduced by other methods, e.g. by certain distillation techniques. Thus, it is within the broader scope of the invention to use, without the added monosulfonic acid, a DMF containing less than 5 gram atoms of tertiary amino nitrogen per $10^9$ grams of DMF.

In a particularly preferred form of the invention, the reaction of the diisocyanate and the hydroxyl-containing compounds in DMF is carried out in the presence of a catalyst for the reaction of —NCO and alcoholic —OH which does not promote dimerization or trimerization of —NCO in DMF. Particularly suitable catalysts are stannous salts of carboxylic acids such as stannous octoate and covalently bonded tin compounds such as dibutyltin dilaurate. These are known catalysts for isocyanate-hydroxyl reactions; see "Polyurethanes Chemistry and Technology Part I. Chemistry" by Saunders and Frisch published 1962 by Interscience Publishers page 168 Table XXX items B and C for compounds of this type. It is found that in the presence of such catalysts the complete reaction can be carried out in DMF which contains substantially no free tertiary amines (the latter having been neutralized by the previously mentioned sulfonic acid, for instance) at a temperature of say 50° C. in a period of only a few hours. Thus an I.V. of about 1 has been reached in about 8 hours or less (the solution thus obtained being non-gelled and capable of being stored for long times without gelling) and the complete reaction of the diisocyanate and the hydroxyl compounds originally present (i.e. the reaction's early stage, previously described) has occurred in less than 4 hours (e.g. 2 hours) in the practice of this invention. In contrast, the previously mentioned Japanese patent requires over 51 hours at 30° C. to obtain a much lower molecular weight polymer even though it uses a ratio of —NCO to —OH which is much higher than that employed in our early stage and which would therefore be expected (by the law of mass action) to make for a much faster reaction rate.

A preferred monosulfonic acid is an arylmonosulfonic acid, such as p-toluene sulfonic acid. Other such acids are benzene sulfonic acid and xylene sulfonic acid. Aliphatic sulfonic acids, such as methanesulfonic acid and ethane sulfonic acid can also be used and it is within the broader scope of the invention to use other monofunctional strong monofunctional mineral acids, e.g. monofunctional monophosphonic acids. In contrast, the substitution of certain other strong acids such as phosphoric acid in place of the arylmonosulfonic acid actually promotes gelation, while the substitution of a strong difunctional acid such as sulfuric acid has been found to give a non-gelled product of a less desirable type, one which is less stable against hydrolysis. Monofunctional carboxylic acids, such as formic acid, has not been found to give the same effect; on the contrary, formic acid acts as a chain terminator.

The proportion of the monofunctional strong acid is, as stated, as least about a stoichiometric amount; that is, enough to provide about one acid group for tertiary amino nitrogen atom in the solution. An excess of the acid may be used; for instance an excess, over the stoichiometric amount, of as much as about 100 p.p.m. of p-toluene sulfonic acid has been used (that is, an amount of the acid sufficient to neutralize all the tertiary amine in the DMF plus 100 parts of the acid, by weight, per million parts of DMF), and the use of an excess of about 20 to 30 p.p.m. may be desirable. The amount of the excess is generally well below 500 p.p.m.

While the use of the monofunctional strong acid has shown its greatest value in the preferred embodiment in which substantially the whole reaction is carried out in DMF, it is also within the broader scope of the invention to employ much an acid in the known process in which the diisocyanate, hydroxyl-terminated prepolymer and chain extender are first reacted in the melt (i.e. in the substantial absence of solvent) and the product is then added to DMF so that further reaction occurs. Here too the presence of the monofunctional strong acid will serve to neutralize the effects of the tertiary amine in the DMF and thus inhibit the dimerization and trimerization reaction which would otherwise take place.

The DMF may be analyzed for its content of impurities by vapor phase chromatography. One such analysis of a DMF showed that it contained 0.34 p.p.m. trimethylamine, 0.18 p.p.m. dimethylamine, 0.61 p.p.m. methanol and 0.75 p.p.m. bis(dimethylamino) methane. The equivalent amounts of toluenesulfonic acid needed for neutralization of the tertiary amine content is about 3½ p.p.m.; about 1 p.p.m. for the trimethylamine and about 2½ p.p.m. for the bis(dimethylamino) methane.

The hydroxyl-terminated prepolymer preferably has a molecular weight below 6000 and more preferably between 800 and 2500; a molecular weight of 1800–2200 is particularly preferred. It may be a polyester of a hydroxycarboxylic acid (e.g. a polycaprolactone) or a polyester of a glycol and a dicarboxylic acid (e.g. ethylene glycol adipate or 1,4-butanediol adipate) or a mixed polyester of these types of components. Examples of other dicarboxylic acids which may be used instead of, or in addition to, adipic acid, are succinic, pimelic, suberic, azelaic or sebacic acids or aromatic acids such as phthalic acid or terephthalic acid. Examples of other glycols which may be used to make the polyester are 1,6-hexanediol and 1,8-octanediol. The most useful polyesters are aliphatic polyesters in which the

groups are separated by aliphatic chains averaging about 3 to 6 carbon atoms in length. A prepolymer which provides flexible or "soft" segments in the polyurethane molecule is preferred.

The hydroxyl-terminated prepolymer may be a polyether. Typical polyethers which are used to provide the soft segments for elastomeric polyurethanes are usually of aliphatic character. One type has the formula H $(RO)_n$H where R is a divalent alkylene radical, such as tetramethylene or ethylene or propylene, and "n" denotes the degree of polymerization.

The preferred diisocyanate is diphenyl methane-p,p'-diisocyanate, but other diisocyanates may be used as such or in admixture therewith. Examples of other diisocyanates are 2,4-toluene diisocyanate, p,p'-diphenyl diisocyanate and tetramethylene diisocyanate. The most suitable diisocyanates have molecular weights below 500.

The chain extender is preferably a low molecular weight glycol. A particularly preferred chain extender is tetramethylene glycol. Others are ethylene glycol, diethylene glycol, hexamethylene glycol or octamethylene glycol. Both hydroxyl groups of the glycol are preferably primary hydroxyls, and the glycol is preferably unbranched (having no branches such as dependent methyl or ethyl groups).

In the preferred class of polyester polyurethanes made with diphenylmethane-p,p'-diisocyanate, those having nitrogen contents in the range of 4 to 5%, most preferably in the neighborhood of 4½%, (e.g. 4.4–4.6%) have been found to be particularly suitable.

A particularly suitable polyurethane is made from a polyester prepolymer of at least 1500 molecular weight, the proportions of aromatic diisocyanate, polyester and chain extender being such that the high molecular weight polyurethane is insoluble in 10% concentration in tetrahydrofuran at room temperature.

A preferred catalyst for use in the reaction is dibutyltin dilaurate. As previously indicated this is a well known catalyst for the isocyanate-hydroxyl reaction. It is acidic in nature and, as shown by Saunders and Frisch (previously cited) gives a high rate of reaction in a solvent-free system at 70° C. as indicated by a relatively short gelation time.

The proportion of catalyst present in the reaction mixture may be, for instance, within the range of about 0.001 to 1% (preferably about 0.01 to 0.05%) based on the total weight of the reactants.

The concentration of the reactants in the DMF is preferably such as to produce a polyurethane concentration in the range of about 15 to 40 to 45%, more preferably about 30 to 35%. The proportion of hydroxyl-terminated prepolymer is preferably in the range of about 40 to 60%, more preferably about 50% (e.g. 48–52%), of the total weight of the polyurethane, and the proportion of the diisocyanate is preferably in the range of about 35 to 45%, more preferably about 40% (e.g. 38–42%) of the total weight of the polyurethane. The proportion of diisocyanate added to the initial mixture of prepolymer and such chain extender as may be present initially is preferably sufficient to supply about 1.01 to 1.2 isocyanate groups per hydroxyl group in the initial mixture.

The reaction is preferably carried out without substantial addition or removal of dimethylformamide.

During the reaction, the reaction mixture is preferably maintained at a temperature below 70° C. more preferably below 60° C. and above 30° C. as indicated previously. It is most preferred to operate at above 40° C.; a reaction temperature of about 50° C. has given very good results.

The solutions produced in accordance with this invention are especially useful for the production of shoe upper material whose base is a microporous sheet consisting essentially of elastomeric polyurethane material. Unlike conventional leather substitutes which have ultimate elongations of some 20–40%, these sheets do not have their extensibility constrained by the presence of a reinforcing fabric (such as a woven or non-woven fibrous fabric) and can be stretched well over 50% (e.g. well over 100% and usually well over 200%). In a preferred form of the invention the solution of the high molecular weight elastomeric polyurethane, produced as described above, is mixed with finely divided pore-forming microscopic particulate material (preferably microscopic sodium chloride particles) the mixture is shaped into sheet form and treated so as to add water to the shape mixture so as to coagulate the polyurethane (which although soluable in DMF is insoluble in a DMF-water mixture containing some 12% water). The coagulated sheet is then treated to remove all the pore-forming particles, e.g. by leaching with hot water, to dissolve out all the salt.

In the preferred embodiment, as indicated previously, the reaction mixture consists essentially of bifunctional reactants and the dimerization and trimerization reactions are controlled so as to avoid cross-linking. Our results so far indicate that essentially linear polymers produce a particularly suitable microporous shoe leather substitute and that the preferred essentially linear polymers have their glass transition temperatures (measured, for instance, by differential thermal analysis) below 0° C. e.g. at —25° C. at the same time that they display a relatively high module of elasticity (in tensile testing).

In one embodiment of the invention a controlled degree of polymer chain branching is produced, while cross-linking and gelation is avoided, by including in the reaction mixture a quantity of monofunctional reagent (e.g. methanol, dimethylamine, or formic acid) and an equivalent amount of a polyfunctional reagent (e.g. a trifunctional alcohol such as trimethylolpropane, trimethylolethane or glycerol) so that the net functionality of these monofounctional and polyfunctional reagents is 2.00 or less. Thus, when the sole polyfunctional reagent is the trifunctional trimethylolpropane, no more than one mol of that compound is present per mol of monofunctional reagent. The amount of poly-functional reagent is relatively small and may be expressed in terms of the number of reactive groups in excess of two (hereafter called its "over-two-reactive groups") provided by the polyfunctional reagent. Obivously one molecule of trimethylolpropane has one "over-two-reactive group" and one molecule of pentaerythritol has two "over-two-reactive groups." The amount of polyfunctional reagent is usually such as to provide well below 3 (e.g. in the range of 0.1 to 2) gram equivalents of "over-two-reactive groups" per 100,000 grams of the reactants (and, since substantially the entire quantity of the reactants is converted to polymer, less than 3 grams equivalents of "over-two-reactive groups" per 100,00 grams of polymer). In two typical products made by us the amount of polyfunctional reactant (trimethylolpropane) is (a) about 1 gram mol and (b) about ⅕ gram mol per 100,000 grams of reactants; since trimethylolpropane has one "over-two-reactive groups" these provide, correspondingly, (a) about 1 and (b) about ⅕ gram equivalent of "over-two-reactive group" in excess of two per 100,000 grams of product. (In these two examples the ratio of the molar amount of added monofunctional reactant (methanol, other than that added as a chain terminator at the end of the reaction) to the molar amount of trimethylolpropane is (a) about 1:1 and (b) about 1.05:1).) It follows that in case (a), if the average molecular weight of the product is assumed to be 100,000, there will be an average of about 1 branch (supplied by the presence of the trimethylolpropane) per polymer molecule, while in case (b) only about a fifth of the polymer molecules will have such a branch. If the average molecular weight of the polymer is assumed to be 50,000 only about half of the polymer molecules will have such a branch, in case (a). Thus, despite the presence of the polyfunctional component, the materials have substantially no chemical cross links and are believed to derive their properties from hydrogen bonding forces rather than cross linkages. Their stress-strain curves are of the same general shape as those shown in FIG. 1 of the article by Stetz and Smith in Rubber Age, May 1965, page 74.

The introduction of branches in the manner described above has yielded polymer solutions which can be allowed to stand for a considerable time before use and which will still produce microporous sheets (on coagulation with water) that have very nearly the same physical properties as those made from the fresh solution. In contrast similar aging of the more truly linear polymer solutions (unless specially treated) has a much greater offect on the physical properties of the microporous sheets made therefrom.

In addition the solutions of the slightly branched polymers appear to yield a microporous sheet of desirably higher density. The reason for this is not understood but it may be related to an increased sensitivity to coagulation on the incorporation of small amounts of water.

As previously described, a chain extender is added after the isocyanate content has reached a constant level (which indicates that the mixture contains substantially no unreacted hydroxyl groups). Best results have thus far been obtained by using a dihydric alcohol as the chain extender at this stage. It is within the broader scope of this invention, however, to employ other difunctional chain extenders at this stage, either alone or in admixture (e.g. in 1:1 molar ratio) with the diol. Examples of such materials are diamines, e.g. p,p'-diaminodiphenylmethane and aminoalcohols, e.g. aminoethanol.

The amount of chain terminator which is added after the reaction mixture has attained the desired molecular weight (as indicated, for instance, by the viscosity of the solution) is not narrowly critical. It should of course be at least sufficient to react with all the remaining —NCO groups but an excess (e.g. a 5% excess) may be used to make sure that the reaction is terminated effectively.

Solutions produced in accordance with this invention have been found to be stable against gelation for long periods of storage at room temperature. Surprisingly, in contrast to the behavior of other solutions of high polymers, they tend to decrease in viscosity on standing. In many cases there is a marked decrease after 1 week, even though the intrinsic viscosity (I.V.) of the polymer recovered from the aged and less viscous solution remains substantially the same as the I.V. of the polymer recovered from the fresh solution. (I.V. is measured on dilute solutions, whose polymer concentration is say, about 1%, while the aging phenomenon is observed with relatively concentrated solutions of, for example, 30% concentration having viscosities of, for instance, about 2000–3500 poises.) It is found also that the physical properties of microporous sheets made from the aged solutions of decreased viscosity are not as good as those made from fresh solutions; e.g. the tear strength may be reduced. The same effects are observed for DMF solutions of high I.V. polyurethanes made by the previously described, known, process of carrying out the reaction in the melt, without solvent, and then dissolving the incompletely reacted product in DMF. Also, when the solutions are reheated and cooled they do not regain their original (fresh) viscosities. Neither is the original viscosity regained when the solutions are treated to recover the polyurethane as a solid, which is then redissolved in DMF.

It has now been discovered that the decrease in viscosity (and the corresponding effect on the properties of the microporous sheets) may be slowed or even eliminated by incorporating an acid into the DMF solution of the polyurethane. Only a small proportion of the acid is needed; for example by the addition of 25 p.p.m. of tartaric acid the viscosity of the solution, and the properties of the microporous products produced therefrom, have been kept at substantially the same high levels as those for the unaged solution. The proportion of acid may be varied over a wide range. For example, the addition of 5000 p.p.m. of tartaric acid has given excellent results; while the use of such relatively large amounts of the acid may increase the cost somewhat, it has not been found to have a detrimental effect, and when (as is preferred) a water-soluble acid is employed any excess is removed from the microporous product during the leaching or water-washing thereof.

The acid may be added to the polyurethane solution directly after the chain-termination step. It may also be added at a later time, e.g. even after the solution has decreased in viscosity; such an addition does not restore the solution to its original viscosity but inhibits or prevents a further decrease in viscosity. It may be added to the DMF solution of the polymer made by the known melt process. It is also within the broader scope of the invention to add the acid with (or in place of) the chain terminator, the amount of acid being sufficient to provide free acid groups, or unreacted acid, in the solution after the chain termination reaction has taken place.

A particularly suitable acid for inhibiting the reduction in viscosity is tartaric acid, which is a moderately strong acid (ionization constant, $K_1$, of $9.6 \times 10^{-4}$) which has two alcoholic hydroxy groups and two carboxy groups. Other acids are adipic, formic, acetic, 1-ascorbic, maleic, malonic, p-toluene-sulfonic, etc.

While the addition of tartaric or other acid is most useful for solutions of high molecular weight polyurethanes in DMF, the acid may also be added for a similar purpose to solutions of other molecular weight polyurethanes (e.g. polyurethanes of 0.6 I.V.) in DMF, including solutions having viscosities (at 25° C.) of about 400 poises or more and concentrations of about 20% or more (e.g. 25%, 35%, 40% or 45%). It is also within the broader scope of the invention to use other liquid amides as the solvents in place of, or in admixture with, the DMF. Examples of other amides are N,N-dimethylacetamide and N-methyl pyrrolidone.

In the accompanying drawings.

Figure 1:
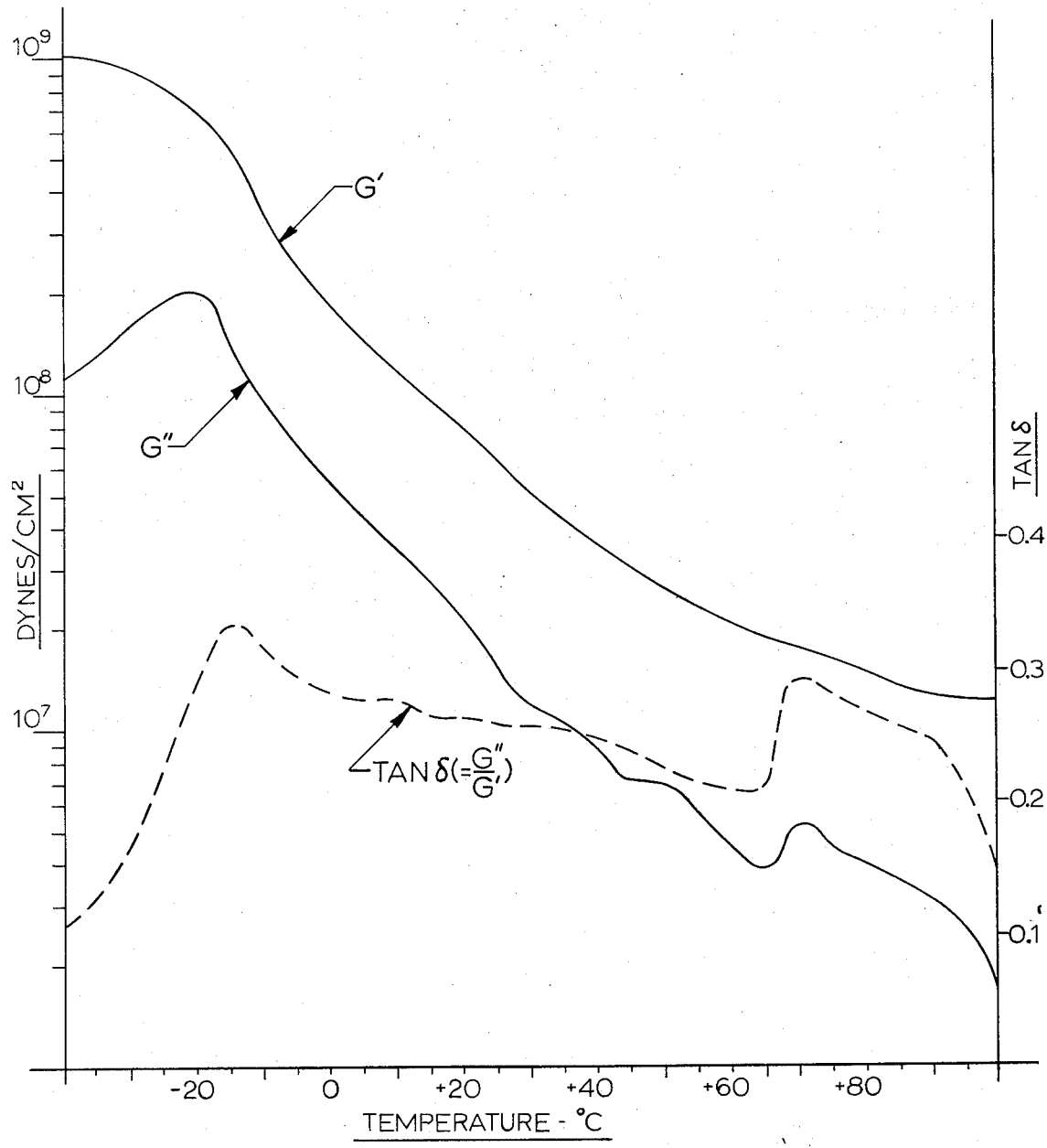
FIG. 1 is a modulus-temperature plot for a microporous sheet made from a preferred essentially linear polyurethane, produced in accordance with this invention.

In FIG. 1 the three curves are for the dynamic shear modulus (G'), the loss modulus (G") and the loss factor (tan δ). The peak in the loss factor corresponds to the glass transition temperature of the polyurethane, which as shown in the graph, is at about −20° C. (e.g. in the range of −10 to −30° C.). The values of G', G" and tan δ can be determined, for example, by the use of a torsion pendulum as described by Nielsen "Mechanical Properties of Polymers" (Reinhold Pub. Corp. 1962) Chapter 7 "Dynamic Mechanical Testing." The low glass transition temperature has been found to correspond to a high flex life of the product (as determined, for example, by the number of cycles of flexing that can be made before the material shows outfold cracks during cold flex testing according to ASTM D-2097 on a Newark Leather Finish Co. flex testing machine operated in an atmosphere at 0° C. or −12° C.). Also to be noted is the relatively sharp peak of the tan δ curve (in the 60–80° C. range), which is believed to indicate the hydrogen bonding, and also the absence of pronounced peaks between the two principal peaks. The particular microporous sheet on which the data plotted in FIG. 1 was obtained was about 1.6 mm. thick and had a density of 0.46 g./cm.³, a water-vapor permeability of about 120% of that of good calf leather and an elongation at break of 332%; the method of making the sheet was similar to that disclosed in Example 1 (i.e. mixing a polyurethane solution in DMF with micropulverized salt, casting a sheet of the mixture, coagulating it with water and leaching it with water, and then drying). In the torsion pendulum test rectangular samples (about ⅜" x 2½") of the microporous sheet were used.

Figure 2:
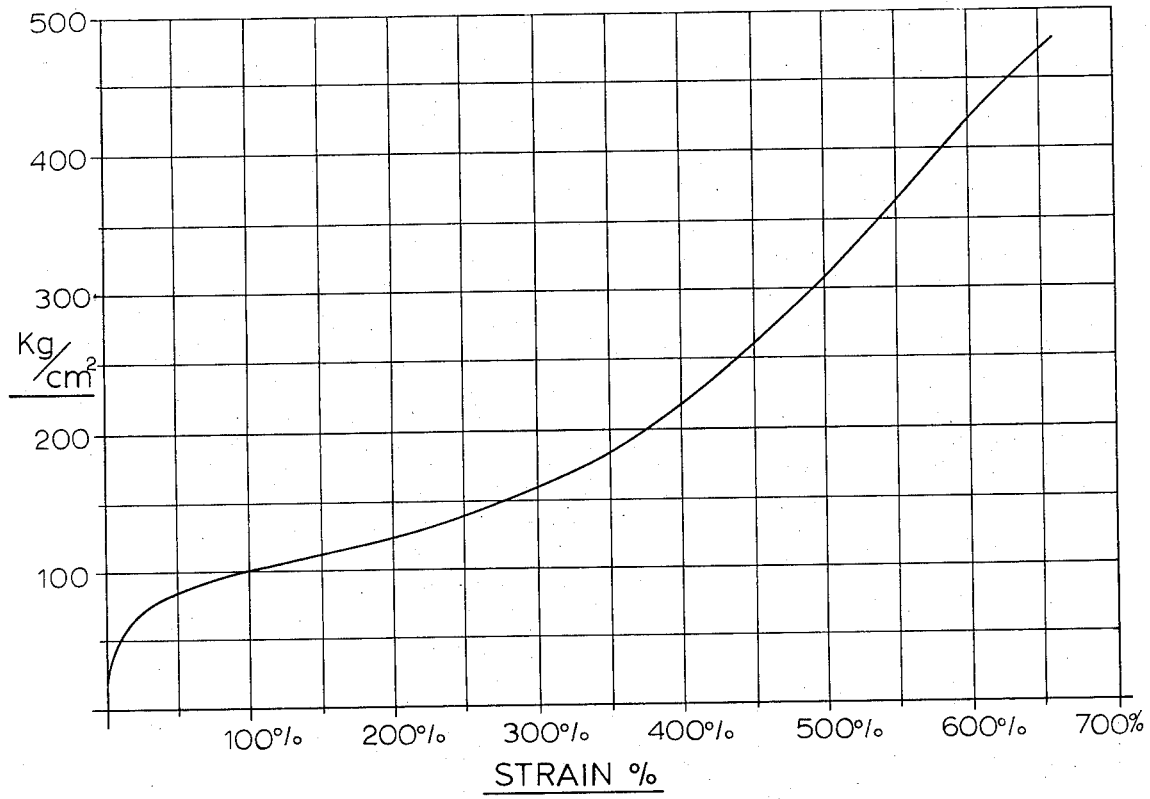
FIG. 2 shows stress-strain plot for a non-porous film made from another preferred essentially linear polyurethane produced in accordance with this invention.
Figure 3:
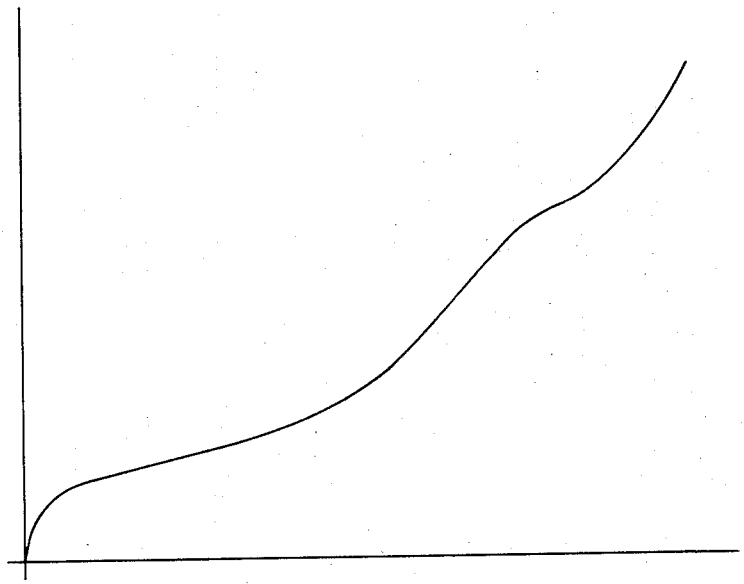
FIG. 3 shows stress-strain plot for a cross-linked polyurethane.

In each of FIGS. 2 and 3 the stress-strain plot was determined on a smooth void-free thin film; for example a film 0.2–0.4 mm. thick made by carefully casting a degassed solution of the polyurethane in DMF and then carefully evaporating off the solvent in a dry atmosphere. The stress-strain test was carired out on an Instron tester (model TM). It will be noted that the curve in FIG. 2 shows two points of inflection ("yield points"). In contrast the corresponding stress-strain curve for a cross-linked polyurethane (in this case made from the same reactants but in the presence of 10 p.p.m. NaOH in addition to the tin-containing catalyst) shows three points of inflection.

The following Examples are given to illustrate this invention more fully. In the Examples all pressures are atmospheric unless otherwise indicated. In the applications all proportions are by weight unless otherwise indicated.

EXAMPLE 1

To 20.7 kg. of N,N-dimethylformamide ("DMF") in a 10 gal. reactor are added (at room temperature) 4423.8 g. Desmophen 2001 polyester (a hydroxyl-terminated polyester of 2000 molecular weight, having a hydroxyl number of about 55.5 mg. KOH per g., made from about 1 mol butane diol-1,5, 1.13 mol ethylene glycol and 2 mols adipic acid), 900.61 g. 1,4-butanediol, 0.5148 g. methanol, 2.154 g. trimethylolpropane, 0.04127 g. p-toluenesulfonic acid, 3.536 g. dibutyl tin dilaurate and 3514.42 g. diphenylmethane-p-p' diisocyanate. The solution is stirred and the unreacted isocyanate content determined by titration every ½ hour. At the end of 2½ hours, the —NCO content having been stable for at least ½ hour, an amount of 1,4-butanediol (74.82 g.) to provide one alcoholic hydroxyl for each unreacted isocyanate group is added. The viscosity of the solution increases over a 6 hour period to 2450 poise (Brookfield, spindle 5 or 6, measured at 25° C.) at which point 160 g. of a 40/60 w./w. methanol/DMF solution is added to stop the reaction. 60 minutes later the reaction mixture is discharged and cooled. The final solution viscosity is 2100 poise; the final intrinsic viscosity is 1.115. During the process the exothermic reaction is moderated by cooling, so that the temperature is kept at about 50° C.

Analysis of the DMF before the reaction shows that it contains a total amount of amine equivalent, in basicity, to 3.8 p.p.m. of dimethylamine; a total amount of acid equivalent, in acidity, to 5.8 p.p.m. of formic acid; and 0.04% of water. The amount of added sulfonic acid is such as to make the DMF distinctly acidic.

The process is carried out under substantially anhydrous conditions. The reactor is predried by flushing dry nitrogen through it at 80° C. and is then cooled under nitrogen to room temperature before the ingredients are charged thereto. The ingredients are added under a nitrogen blanket. The DMF is added first (after it has passed through a column of a molecular sieve for removal of traces of water); next the polyester, butanediol and catalyst are added in that order and the mixture is agitated for 15 minutes. The diisocyanate is then added while stirring and the reactor is sealed and the agitation is effected at a higher rate for the remainder of the reaction.

800 g. of the above polyurethane solution is mixed into 427 g. of micropulverized sodium chloride (average particle size 10 microns, maximum particle size 52 microns) contained in a one gallon, two-arm kneader. After being mixed for 65 minutes, the mixture is degassed at 4 mm. Hg for about 30 minutes, spread between 3.25 mm. shims onto a porous temporary support (a sintered polyethylene sheet treated with "Duponol ME" surfactant), immersed in 20° C. water for one hour, then overnight in 57° C. water, dried and removed from the temporary support.

The resulting sheet is 1.9 mm. thick and has a density of 0.40 g./cm.$^3$, a water vapor transmission of 720/g./m.$^2$/24 hrs. and a slit tear strength of 3.4 kg.

The microporous product is soluble in DMF and any scrap thereof may be mixed with freshly produced polyurethane and DMF and recycled to the process; thus, the scrap may be used to make more of the solution which is cast onto the temporary support. In such recycling the ratio of recycled polyurethane to fresh polyurethane may be, for example, 2:1, 1:1 or 0.1:1.

The water used for coagulating the cast layer picks up DMF from that layer forming a DMF-water mixture. The DMF is recovered from this mixture for reuse by distilling off the water.

EXAMPLE 2

Example 1 is repeated without using a polyfunctional reactant such as trimethylolpropane. The amounts used are as follows: 770 parts DMF, 205 parts polyester, 46.5 parts butanediol (in the initial mixture) 0.01846 part p-toluenesulfonic acid, 0.1616 part dibutyltin dilaurate, 171.6 parts diphenylmethane - p,p' - diisocyanate. The NCO:OH molar ratio in the charge is about 1.1:1. The amount of diol added after the —NCO content becomes stable is about 3–5 parts (that is, in a series of eight successive runs under substantially the same conditions the amounts added, as determined from the NCO analysis, are 4.183, 3.063, 4.85, 4.631, 5.055, 4.939, 4.473 and 4.903 parts, respectively). The amount of the methanol/DMF mixture (50/50 w./w.) added as a chain terminator is 7.5 parts. The final polymer contains 4.50% nitrogen and has an I.V. of 1.075; its polymer-solvent interaction parameter (K' in the Huggins equation) is 0.519. The solution has a total nonvolatile content of 31.4% and a viscosity of 2400 poises.

In this Example the —NCO content is measured after ¾ and 1½ hours of reaction and is found to be unchanged, whereupon the 3–5 parts of diol is added. After another 5½ hours of reaction the chain terminator is added.

Analysis of the DMF, before reaction, by vapor phase chromatography shows that it contains 0.34 p.p.m. trimethylamine, 0.18 p.p.m. dimethylamine, 0.61 p.p.m. methanol and 0.75 p.p.m. bis(dimethylamino) methane.

EXAMPLE 3

Example 1 is repeated, using the following amounts of materials: 600 parts DMF, 130 parts polyester, 28.38 parts butanediol, 0.1022 part dibutyl tin dilaurate, 0.006 part p-toluenesulfonic acid, 0.0875 part methanol (in the initial mixture), 0.350 part trimethylolpropane, 108.8 parts of the diisocyanate. The NCO:OH molar ratio in the charge is about 1.14:1. The amount of diol added after the —NCO content becomes stable is about 3½ parts (that is in a series of four successive runs under substantially the same conditions the amounts added, as determined from the NCO analysis, are 3.67, 3.45, 3.30 and 3.50 parts, respectively). The amount of the methanol/DMF mixture (50/50 w./w.) added as a chain terminator is 5 parts. The final polymer contains 4.50% nitrogen and has an I.V. of 1.030; its polymer-solvent interaction parameter (K' in the Huggins equation) is 0.471. The solution hash a total nonvolatile content of 31.4% and a viscosity of 2500 poises.

In this Example the —NCO content is measured after 1½ and 2 hours of reaction and is found to be unchanged, whereupon the 3½ parts of diol is added. After another 5½ hours of reaction the chain terminator is added.

Analysis of the DMF, before reaction, by vapor phase chromatography shows that it contains 0.03 p.p.m. trimethylamine, 7.8 p.p.m. bis(dimethylamino) methane and 0.08 p.p.m. By titration it is found to contain an amount of acid equivalent to 7.8 p.p.m. of formic acid and an amount of base equivalent to 6.2 p.p.m. dimethylamine.

EXAMPLE 4

To the chain-terminated solution produced in Example 2, tartaric acid is added, in amount of 50 p.p.m. based on the total weight of solution. The solid tartaric acid dissolved in the solution, with agtition. The solution substantially retains its viscosity on aging at room temperature for a month.

EXAMPLE 5

To a chain-terminated solution similar to that produced in Example 2 but reacted to a lesser extent (the I.V. of the polymer being about 0.8) there are added 0.5% of various acids and the solution is allowed to stand for 6 days at room temperature in a closed container. The initial viscosity of the solution is 500 poises. After the 6 days, without any addition of acid, its viscosity is 400 poises, and the acid-containing solutions have the following viscosities in poises: tartaric 575, 1-ascorbic 500, adipic 460, acetic 460, formic 450.

EXAMPLE 6

A chain-terminated polymer solution having a viscosity of 3230 poises and containing 31.5% solids is produced in the same general manner as described in Example 2. The dissolved polymer has a nitrogen content of 4.55%, an I.V. of 1.140, and a K' value of 0.496. A portion of the fresh solution is formed into a microporous sheet by mixing it with micropulverized salt and, 3 days after preparation of the solution, casting the solution-salt mixture in a layer and coagulating and leaching it with water, as previously described. Other portions of the solution, or solution-salt mixture, are allowed to stand in closed containers at room temperature, with and without the initial addition of 25 p.p.m. of tartaric acid, for 12 days before forming microporous sheets in a similar way therefrom. The following results are obtained:

|  | No tartaric acid | | With 25 p.p.m. tartaric acid |
| --- | --- | --- | --- |
|  | 3 days | 12 days | 12 days |
| Notch tear strength (kg./mm.) | 2.85 | 2.48 | 2.94 |
| Density (g./cm.$^3$) | 0.495 | 0.428 | 0.470 |
| Modulus at 25% elongation (kg./cm.$^2$) | 18.9 | 15.9 | 18.2 |
| Tensile strength (kg./cm.$^2$) | 95.2 | 84.5 | 93.0 |
| Ultimate elongation, percent | 317 | 327 | 329 |

The intrinsic viscosity is determined in highly dilute solution in analytical grade DMF which has been thoroughly dried by storage under a nitrogen atmosphere over a molecular sieve (Linde 5A). Four measurements at 250° C. corresponding to four, approximately equally spaced, concentrations are made on intrinsic viscosity and polymer-solvent interaction parameter are determined by the Huggins equation:

$$\frac{\eta_{sp}}{C} = [\eta] + K^1[\eta]^2 C$$

where $\eta_{sp}$ is the specific viscosity and C is concentration expressed in g./100 ml. and $[\eta]$ is the intrinsic viscosity.

For use in making shoe upper materials the preferred polyurethanes have melting points of at least 100° C.

preferably above 150° C. (e.g. about 170 to 200° C., as measured by differential thermal analysis or differential scanning calorimetry). When formed into a smooth void-free thin film 0.2–0.4 mm. in thickness they have the properties described below: a tensile strength of at least 210 kilograms per square centimeter (preferably at least 350, e.g. about 420 to 560), a percent elongation at break of at least 300% (preferably at least 400%, e.g. about 500 to 700%), an elastic modulus of at least 105 kilograms per square centimeter (preferably at least 350 e.g. about 560 to 770), a 100% secant modulus (stress divided by strain at 100% elongation) of at least 28 kilograms per square centimeter (preferably at least 84, e.g. about 110 to 134). These mechanical properties are measured by ASTM D882-67.

The preferred polyurethane (again, tested as a thin film made as described above) recovers completely from a 5% elongation at room temperature (23° C.) but preferably does take on a permanent set (one measured for example as in an ASTM D412-66) after a 100% elognation. This set is usually within the range of about 5 to 20%, as in the range of about 10 to 20%, e.g. about 15%. The "permanent set" is usually measured an hour after the release of stress; for example, a material which shows a tension set of some 24–26% immediately on release of the clamps after being held at the 100% elongation for 10 minutes will have a tension set of 14% measured 1 hour after the release of the clamps. (In the measurement a film specimen 1 cm. wide with a gage length of 5 cm. and is strained to the 100% elongation at a rate of 254% per minute.) Preferably the material has a Shore hardness of at least 75A (more preferably about 90A to 60D), measured by ASTM D1706-67.

As indicated, the preferred technique for making the microporous shoe upper sheet material is by casting a thick layer of a suspension of microscopic salt particles in the DMF solution of the polyurethane, coagulating the solution and leaching out the salt. The thickness of the coagulated sheet, after leaching and drying is at least 25 mils (0.63 mm.), e.g. about 30 to 100 mils (about 0.75 to 2.5 mm.) and preferably about 30 to 70 mils (about 0.75 to 1.8 mm.). Other techniques may be employed. Thus other coagulating methods may be used to treat the thick layer of the mixture of polyurethane solution and leachable material. Among such coagulating methods are cooling the mixture, (e.g. −78° C.), or subjecting the mixture to vapors of non-solvent (e.g. to a humid atmosphere), or simply evaporating the solvent, preferably at a rate slow enough to avoid the formation of macroporous bubbles or holes in the sheet, or using various combinations of these coagulating methods (e.g. freeze drying techniques) before removal of the leachable material (e.g. NaCl) or other microscopic particulate material. In place of, or together with, the salt particles, other pore-forming microscopic particulate material may be used. These particulate materials may be starch particles (which may be removed by treating the coagulated layer with an aqueous starch-digesting agent, such as an enzyme, of known type). Or they may be other microscopic solid particles which are insoluble in the polyurethane solution and which can either be dissolved out by treating the coagulated sheet with water or other suitable solvent for the particle which is a non-solvent for the polyurethane or can be otherwise destroyed or removed; examples of such particles are sodium carbonate, oxalic acid, ammonium carbonate, or suitable microballoons. Alternatively, the void-forming particulate material may be in the form of dispersed microscopic droplets of a liquid insoluble in the solution of polyurethane or in the form of dispersed microscopic bubbles of gas. The particle size of the microscopic particulate material is well below 100 microns, preferably less than 50 microns and greater than about one micron, more preferably in the range of about 3 to 20 microns. The ratio of the total volume of the microscopic particulate void forming material and the total volume of polyurethane in solution may be, for instance, in the range of about 0.5:1 to 5:1, preferably in the range of about 1:1 to 3:1; thus 178 grams of the sodium chloride particles may be mixed with 333 grams of a 30% solution of the polyurethane in dimethylformamide, giving a volumetric salt:polymer ratio of 1:1.

The microporous sheet material (preferably after some surface finishing treatment) may be used in the manufacture of shoes in the same way as conventional shoe upper leather or upper leather substitutes. Thus in making shoes it is customary to cut the upper leather, usually with a die by machine, and to fit and assemble the parts of the upper together (including any doubler or lining that is to be used) as by stitching and/or cementing so as to ready the upper for lasting. After the insole has been secured to the bottom of the last, the upper is placed on the last, pulled over the wooden last so as to conform tightly to it, and attached to the insole. This "pulling over" is generally effected by mechanisms which grip, and pull, the upper at its edges, e.g. at the toe and sides.

During the fitting together of the upper, the edges of the upper leather are generally "skived," by cutting a bevel on the "fleshside" of the leather adjacent its edge and the skived edge is then cemented, folded back on itself and pressed in place, to give a neat finished top line or other edge.

Descriptions of the conventional methods for making shoes are contained in the 61 page publication "How American Shoes Are Made" 3rd edition, copyright 1966 by United Shoe Machinery Corporation.

Excellent shoes have been made with materials produced in accordance with this invention in place of the usual upper leather. The upper not only conforms unusually well to the last, without wrinkling or puckering, but also retains its lasted shape very well after removal from the last, particularly when the upper has been given the conventional type of heat setting treatment (e.g. setting with heat alone or moist heat) on the last. The material has very good skiving characteristics, particularly if it is wet with water prior to skiving. The shoes are comfortable and the uppers show very good wear resistance. Unlike many shoes made with the conventional fabric-reinforced leather substitutes, there is no problem of fabric show-through or orange peel on lasting.

The "microporous" materials used in the process of this invention have pores invisible to the naked eye of a person with 20/20 vision. Such pores measure less than 100 microns in their maximum dimension (when a plane surface, such as the top or bottom of the material or a cross-section thereof is observed). As will be seen from FIG. 4, the pores generally measure well below 50 microns in their maximum dimension.

The microporous sheet preferably has an apparent density in the range of about 0.25 to 0.7 grams/cm.$^3$, more preferably in the range of about 0.35 to 0.5 grams/cm.$^3$. Typically the density of the polyurethane itself is about 1.2; it will therefore be apparent that in the neighborhood of ¼ to ½ of the volume of the microporous material is air. The sheet preferably has a percent elongation at break of above 50% (e.g. in the range of about 300 to 400% or more); a tensile strength above 35 kg./cm.$^2$ (e.g. in the range of about 60 to 100); an elastic modulus above 2 kg./cm.$^2$ (e.g. in the range of about 4 to 9), and a notch tear strength above 2 (e.g. in the range of 3 to 5) kg. per mm. of thickness. It should permit the passage of water vapor; thus its water vapor transmission should be at least 200 g./m.$^2$/24 hrs. (measured as in ASTM E 96–66, procedure B). Also, it is desirable that at least the upper surface of the sheet, after suitable finishing, be resistant to the passage of liquid water, e.g. the finished sheet should have a hydrostatic head (British Standard 2823) of above 100 mm. Hg. While the polyurethane itself usually shows a tension set below 100%, as previously discussed, the preferred microporous polyurethane sheets generally recover completely with substantially no permanent set (under standard dry conditions at room temperature) after being stretched 100%.

All measurements referred to herein are made at room temperature (e.g. 23° C.) unless the test method specifies otherwise.

It is within the broader scope of the invention to carry out the multistage reaction scheme, described herein, in solvents other than DMF, and to apply it to reaction mixtures which consist essentially of difunctional reactants and contain other reactants in addition to the diisocyanate, hydroxyl-terminated prepolymer and diol, such as compounds having other isocyanate-reactive active-hydrogen-containing groups. It is also within the broader scope of the invention to apply our discovery of the advantages of the use of DMF of low free tertiary amine content (such as DMF whose free tertiary amine content has been neutralized by strong monofunctional mineral acid) in the formation of polyurethanes from dihydroxy compounds and diisocyanates, generally, using dihydroxy compounds and diisocyanates known to those skilled in the art. It is also within the broader scope of our invention to apply our discovery of the advantages of controlled chain branching in solution (as described previously) to polyurethane-forming reactions carried out in solvents other than DMF.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. Process for the production of a solution of high molecular weight polyurethane in a solvent which comprises reacting at least one bifunctionally reactive compound having two hydroxyl groups and at least one bifunctionally reactive compound having two isocyanate groups together with a polyfunctional compound having more than two isocyanate-reactive active hydrogen-containing groups and a monofunctional active hydrogen-containing compound having only one isocyanate-reactive group, the amount of said monofunctional and polyfunctional compounds being such that their net functionality taken together is at most 2.00, the amount of said polyfunctional compound being such as to provide about 0.1 to 3 gram equivalents of reactive group in excess of two per 100,000 grams of the polyurethane-forming reactants, said reactive compounds having molecular weights below 6,000, continuing said reaction until a dissolved polymer having an intrinsic viscosity of 0.9 to 1.4 (measured in dimethyl formamide at 25° C.) is produced and terminating said reaction by adding an isocyanate-reactive chain terminating agent, the elements of said polyurethane-forming reactants consisting of carbon, hydrogen, oxygen and nitrogen.

2. Process as in claim 1 in which said reaction is effected in the presence of a catalyst for the reaction of —NCO and alcoholic —OH which does not promote dimerization or trimerization of —NCO in dimethylformamide.

3. Process as in claim 1 in which the bifunctionally reactive compound having two hydroxyl groups comprises a polyester or polyether having a molecular weight below 6000.

4. Process as in claim 1 in which said reaction is effected in the presence of a catalyst comprising a stannous salt of a carboxylic acid or a covalently bonded tin compound, at a temperature below 70° C.

5. Process as in claim 4 in which said reaction is effected at a temperature above 40° C. in dimethylformamide having a free tertiary amine content of less than 5 gram atoms of tertiary amino nitrogen per $10^9$ grams of dimethylformamide.

6. Process as in claim 5 in which said dimethylformamide contains tertiary amine and a strong monofunctional mineral acid in amount to provide at least one monofunctional strong acid group per teritary amino nitrogen.

7. Process as in claim 6 in which said reactants comprise a glycol adipate polyester of 2,000 molecular weight, diphenylmethane - p,p' - diisocyanate, trimethylolpropane and methanol.

8. Process for the production of a solution of high molecular weight polyurethane in a solvent which comprises reacting at least one bifunctionally reactive compound having two hydroxyl groups and at least one bifunctionally reactive compound having two isocyanate groups together with a polyfunctional compound having more than two isocyanate-reactive active hydrogen-containing groups and a monofunctional active hydrogen-containing compound having only one isocyanate-reactive group, the amount of said monofunctional and polyfunctional compounds being such that their net functionality taken together is at most 2.00, the amount of said polyfunctional compound being such as to provide about 0.1 to 3 gram equivalents of reactive group in excess of two per 100,000 grams of the polyurethane-forming reactants, said reactive compounds having molecular weights below 6,000, continuing said reaction until a dissolved polymer having an intrinsic viscosity of 0.9 to 1.4 (measured in dimethyl formamide at 25° C.) is produced and terminating said reaction by adding an isocyanate-reactive chain terminating agent, said monofunctional compound being methanol and said polyfunctional compound being trimethylolpropane.

References Cited
UNITED STATES PATENTS

| | | | |
|---|---|---|---|
| 2,929,800 | 3/1960 | Hill | 260—32.6 NR |
| 3,184,426 | 5/1965 | Thoma | 260—32.6 NR |
| 3,446,771 | 5/1969 | Matsubayashi | 260—32.6 NR |
| 3,503,934 | 3/1970 | Chilvers | 260—75 NH |
| 3,542,740 | 11/1970 | Pumpelly | 260—77.5 AP |

MORRIS LIEBMAN, Primary Examiner

P. R. MICHL, Assistant Examiner

U.S. Cl. X.R.

260—2.5 AY, 75 NH, 75 NQ, 77.5 AA, 77.5 AQ, 77.5 AM 77.5 SS

UNITED STATES PATENT OFFICE
CERTIFICATE OF CORRECTION

Patent No. 3823111            Dated July 9, 1974

Inventor(s) Frederic Christian Loew, Edward Stone

It is certified that error appears in the above-identified patent and that said Letters Patent are hereby corrected as shown below:

Column 4, line 67,

"40 to 45% should read

--- 40 or 45% ---

Signed and sealed this 5th day of November 1974.

(SEAL)
Attest:

McCOY M. GIBSON JR.            C. MARSHALL DANN
  Attesting Officer                 Commissioner of Patents